(12) United States Patent
Strothmann

(10) Patent No.: US 9,714,046 B2
(45) Date of Patent: Jul. 25, 2017

(54) DEVICE, IN PARTICULAR VEHICLE, INTENDED TO BE MOVED BY MUSCLE FORCE

(71) Applicant: Rolf Strothmann, Saarbrücken (DE)

(72) Inventor: Rolf Strothmann, Saarbrücken (DE)

(*) Notice: Subject to any disclaimer, the term of this patent is extended or adjusted under 35 U.S.C. 154(b) by 0 days.

(21) Appl. No.: 14/759,001

(22) PCT Filed: Jan. 3, 2014

(86) PCT No.: PCT/DE2014/100001
§ 371 (c)(1),
(2) Date: Jul. 2, 2015

(87) PCT Pub. No.: WO2014/106509
PCT Pub. Date: Jul. 10, 2014

(65) Prior Publication Data
US 2015/0336598 A1    Nov. 26, 2015

(30) Foreign Application Priority Data

Jan. 7, 2013   (DE) .................. 10 2013 100 088

(51) Int. Cl.
*H02P 6/00*     (2016.01)
*H02P 6/24*     (2006.01)
*B62B 5/00*     (2006.01)
*H02P 6/28*     (2016.01)

(52) U.S. Cl.
CPC .......... *B62B 5/0056* (2013.01); *B62B 5/0033* (2013.01); *B62B 5/0069* (2013.01); *B62B 5/0073* (2013.01); *H02P 6/24* (2013.01); *H02P 6/28* (2016.02); *B62B 2202/404* (2013.01)

(58) Field of Classification Search
CPC ................. H02P 6/00; H02P 6/24; B62B 5/00
USPC ............................... 318/400.37, 400.01, 700
See application file for complete search history.

(56) References Cited

U.S. PATENT DOCUMENTS

| 5,540,296 A | * | 7/1996 | Strothmann | ........... | A63B 55/61 |
| | | | | | 180/165 |
| 5,717,303 A | * | 2/1998 | Engel | ...................... | B60L 7/003 |
| | | | | | 307/56 |
| 5,789,884 A | * | 8/1998 | Hancock | .................. | G05G 7/00 |
| | | | | | 318/139 |

(Continued)

FOREIGN PATENT DOCUMENTS

| DE | 10008451 A1 | 8/2001 |
| DE | 102010020906 A1 | 11/2011 |

(Continued)

*Primary Examiner* — Kawing Chan
(74) *Attorney, Agent, or Firm* — Lucas & Mercanti, LLP; Klaus P. Stoffel

(57) ABSTRACT

A device, in particular a vehicle, intended to be moved by muscle force, including an electric machine, which influences the movement of the device in addition to the muscle force and which produces an additional force, at least one sensor for measuring the muscle force acting on the device, and apparatuses for controlling the production of the additional force by the electric machine on the basis of the measurement signal of the sensor. The apparatuses for controlling the production of the driving and/or braking force include a load device for converting electrical energy produced by the electric machine operating as a generator into another form of energy, in particular heat.

11 Claims, 2 Drawing Sheets

(56) References Cited

U.S. PATENT DOCUMENTS

| | | | | |
|---|---|---|---|---|
| 6,175,203 B1* | 1/2001 | Liao | ........................ | G05G 7/00 |
| | | | | 318/280 |
| 7,562,729 B2* | 7/2009 | Hammerle | .............. | B60R 25/00 |
| | | | | 180/65.1 |
| 8,965,615 B2 | 2/2015 | Brandenstein et al. | | |
| 2005/0252700 A1* | 11/2005 | Kitauchi | ............. | B60L 11/1877 |
| | | | | 180/65.1 |
| 2006/0096793 A1* | 5/2006 | Akagi | .................... | A61G 5/045 |
| | | | | 180/65.1 |
| 2007/0062774 A1 | 3/2007 | Akagi et al. | | |
| 2007/0256872 A1* | 11/2007 | Yamamuro | ............ | A61G 5/045 |
| | | | | 180/65.51 |
| 2012/0012412 A1* | 1/2012 | Moeller | ................... | B62M 6/45 |
| | | | | 180/206.2 |

FOREIGN PATENT DOCUMENTS

| | | | |
|---|---|---|---|
| EP | 1114763 A1 | | 7/2001 |
| JP | 2012039839 A | * | 2/2012 |
| WO | 9503096 A1 | | 2/1995 |

* cited by examiner

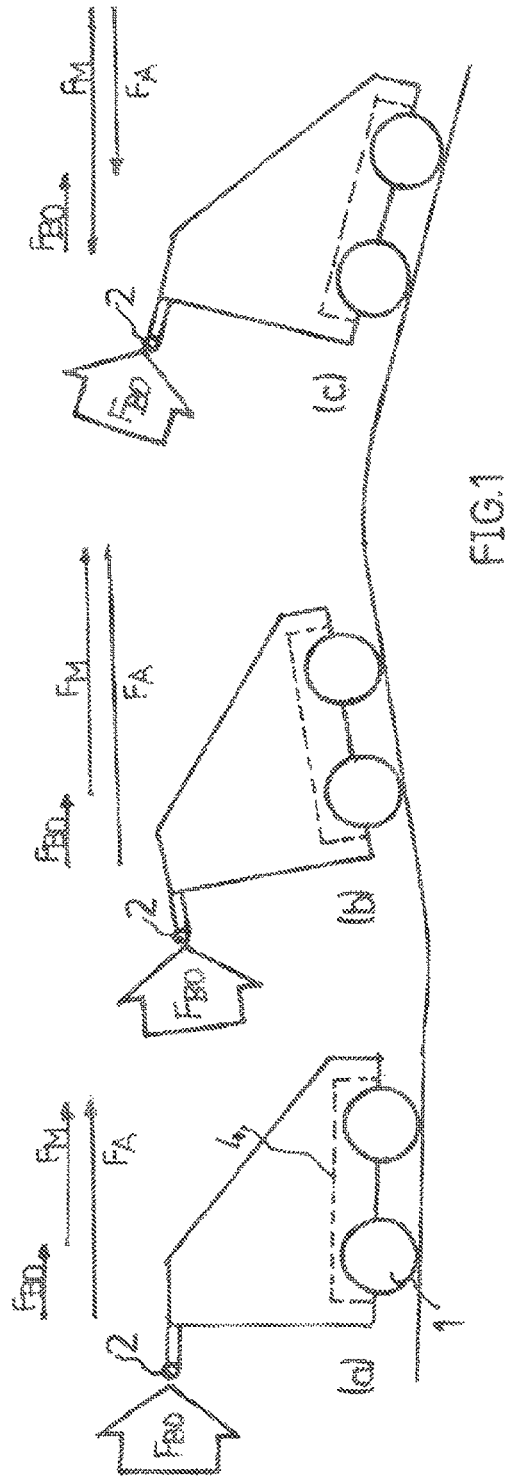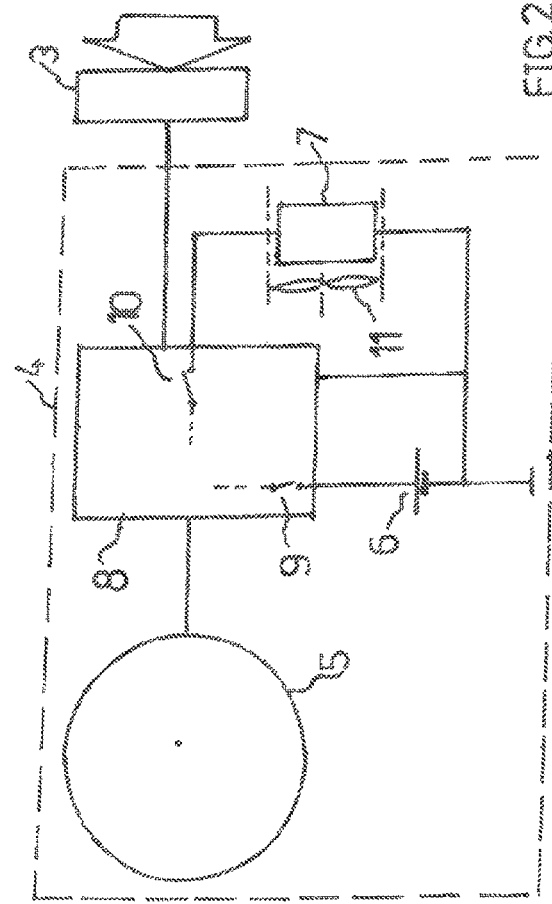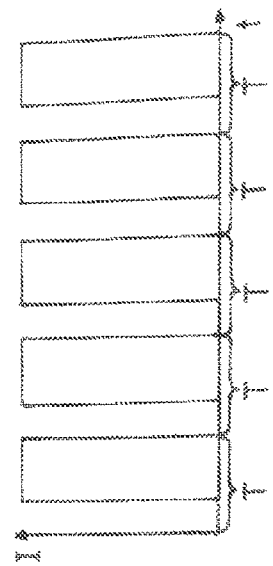

DEVICE, IN PARTICULAR VEHICLE, INTENDED TO BE MOVED BY MUSCLE FORCE

The present application is a 371 of International application PCT/DE2014/100001, filed Jan. 3, 2014, which claims priority of DE 10 2013 100 088.6, filed Jan. 7, 2013, the priority of these applications is hereby claimed and these applications are incorporated herein by reference.

BACKGROUND OF THE INVENTION

The invention pertains to a device, especially a vehicle, intended to be moved by muscular force, with
- an electrical machine, which influences the movement of the device in addition to the muscular force ($F_B$);
- an electrical machine which generates drive and/or braking force ($F_B$);
- at least one sensor for measuring the muscular force ($F_B$) acting on the device; and
- devices for controlling the generation of the drive and/or braking force ($F_M$) by the electrical machine on the basis of the measurement signal ($F_{B'}$) of the sensor.

In addition to vehicles of many different types for many different purposes, a device to be moved by muscular force can also be, for example, the sliding carriage of a machine tool or a pivoting load-carrying arm. In each case, what is involved is an object which is to be put into motion or held by the action of muscular force A golf caddy with an auxiliary electric drive exhibiting the features mentioned above is known from WO 95/03096. The sensor housed in the handle of the push/pull shaft of the caddy detects the pulling or pushing force acting on the handle. The electrical machine of the auxiliary drive exerts an additional drive and/or braking force in such a way that, independently of the terrain conditions, the user is never called upon to overcome more than the same, comfortably selected traveling resistance at all times, regardless of whether the user is going uphill or steeply downhill. The electrical machine supports the user when the path proceeds uphill, and it brakes the caddy when the path proceeds downhill. The electrical energy produced during braking is stored in a battery forming the brakeload, which battery otherwise delivers operating current for the generation of the drive forces.

SUMMARY OF THE INVENTION

The invention is based on the goal of creating a new device movable by muscular force of the type described above with improved possibilities for controlling the generation of power by the electrical machine.

The device according to the invention which achieves this goal is characterized in that the devices for controlling the generation of the additional force ($F_M$) comprise loading means for converting the electrical energy generated by the electrical machine in generator mode into a different form of energy, in particular heat.

It is advantageous that the loading means according to the invention allow the automatic generation of braking forces by the electrical machine, which, for example, make it unnecessary for the user to exert uncomfortable counterforce when going downhill or provide a convenient traveling resistance to be overcome by the user.

Especially in combination with a battery, which forms both a source of drive energy and also a load for the electrical machine and which also stores the electrical energy generated by the electrical machine, the advantage is obtained that, in the case of a completely charged (or removed) battery, the possibility of generating braking forces continues to exist, in that the battery is replaced as a load by the loading means.

The control device, furthermore, is preferably provided to control automatically the distribution of the electrical energy generated by the electrical machine in generator mode between the loading means and the battery, wherein the distribution is achieved in particular as a function of the amount of the additional force ($F_M$) and/or the charge state of the battery.

It is advisable for the control devices to comprise switching means for connecting the loading means and/or the battery as load to the electrical machine.

In particular, the control devices can be provided to connect the loading means and/or the battery periodically as load to the electrical machine for varying time fractions of the period (T).

In a further elaboration of the invention, the control devices can set different time fractions and/or periods for the connection of the loading means and the battery. In this way, the electrical energy generated in generator mode can be distributed in any was desired between the battery and the loading means.

In one embodiment, the loading means comprise a load resistance, the resistance value of which can be varied by the control devices.

In an especially preferred embodiment of the invention, devices for dissipating the heat from the loading means, especially in the form of an air cooling system, are provided.

In a further elaboration of the invention, the load resistance is formed by the windings of the electrical machine itself, and the electrical machine can be short-circuited to generate a braking force, in particular periodically, for certain periods of time.

In the latter case, it is advisable for the electrical machine to be provided with a heat-dissipating device, especially with an air cooling system, to create flow through the windings.

The previously mentioned control device can be provided to adjust the drive and/or braking force in accordance with a predetermined functional relationship ($F_M=f(F_B)$) between the drive and/or braking force ($F_M$) and the muscular force $F_B$ or the measurement signal ($F_{B'}$) of the sensor. The control device is preferably provided to adjust the drive and/or braking force in such as way as to keep the measurement signal of the sensor at a constant value or at a value defined by the functional relationship.

The device according to the invention is provided in particular for movement by means of a pulling or pushing force acting externally on the device.

In one embodiment, the device is a golf caddy.

The invention is explained in greater detail below on the basis of exemplary embodiments and the attached drawings illustrating these exemplary embodiments;

BRIEF DESCRIPTION OF THE DRAWING

FIG. 1 shows a drivable device according to the invention in various driving states;

FIG. 2 show a schematic diagram of an assembly of the device of FIG. 1 comprising an electrical machine;

FIG. 3 shows a diagram explaining how a braking force is generated by the electrical machine of FIG. 2.

DETAILED DESCRIPTION OF THE INVENTION

Figure 4:
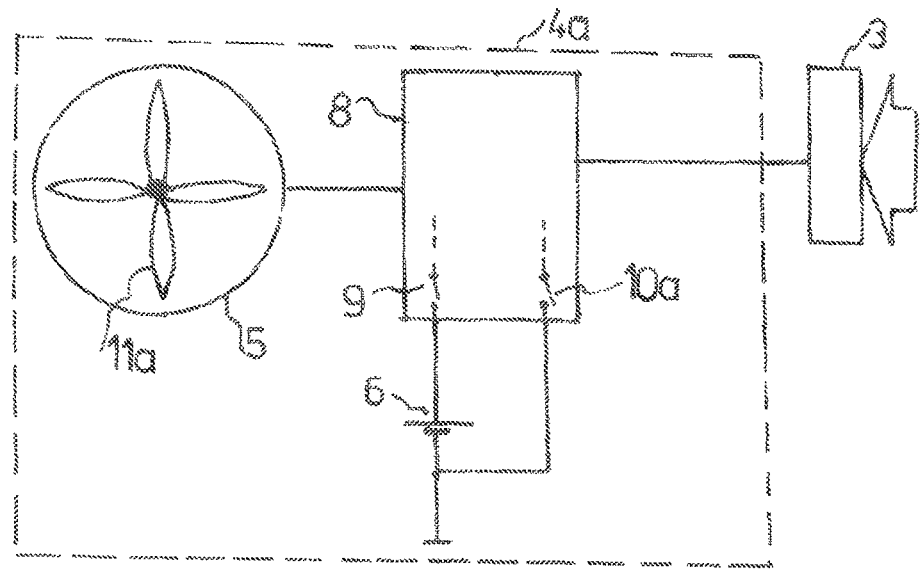
FIGS. 4 and 5 show additional exemplary embodiments of electrical machines and assemblies of devices according to the invention comprising control devices.

A vehicle movable by muscular force comprises wheels 1 and a handle shaft 2. The vehicle can be pushed or pulled by the handle shaft 2. In the handle shaft 2, a sensor 3, shown schematically in FIG. 2, is housed; this sensor measures the pushing or pulling force being exerted on the handle shaft 2.

The vehicle also comprises an assembly 4, which, in the example shown here, comprises a three-phase synchronous motor 5, a battery 6, a load resistance 7, and a switching and control unit 8. The switching and control unit 8 controls the current supplied to the electrical machine 5 by the battery 6 according to the pulse-width-modulation method and also controls the production of current by this machine in generator mode.

The switching and control unit 8 also continuously receives the measurement signal $F_{B'}$ of the sensor 3 representing the pushing or pulling force $F_B$ on the handle shaft 2. It compares this measurement signal with a previously determined value, which corresponds to a certain pushing or pulling force $F_{B0}$, symbolized in FIG. 1 by an arrow, i.e., the force which the user of the vehicle is called upon to exert. It is obvious that $F_{B0}$ can be set to a comfortable value.

In the exemplary embodiment shown here, the switching and control unit 8 keeps the continuously received measurement signal $F_{B'}$ at this previously determined value corresponding to the force $F_{B0}$ by continuously adjusting a supporting or opposing force $F_M$ of the electrical machine in such a way that the sum of the forces $F_{B0}$ and $F_M$ is always equal to the drive load $F_A$ necessary to maintain a uniform or uniformly accelerated movement of the vehicle.

As FIG. 1 shows, the drive load $F_A$ necessary to maintain a uniform movement of the vehicle along a path can change as a function of the rise or fall of the path. In comparison to the situation in position (a) of the vehicle, the drive load $F_A$ necessary to maintain uniform movement has increased in position (b) because of the rise in the path. In correspondence with this increase, the switching and control unit 8, while keeping the force $F_{B0}$ to be exerted by the user constant, increases the drive force $F_M$ of the electrical machine 5. In position (c), as a result of the downhill grade, the drive load $F_A$ necessary to maintain uniform movement of the vehicle assumes negative values; that is, the vehicle is to be braked in this position. The switching and control unit 8 in this case instructs the electrical machine 5 to operate in generator mode and to produce a negative force $F_M$ acting in the direction opposite the travel direction. The absolute value of this negative force in the exemplary embodiment here is so large that the user continues to be called upon to exert the same positive, comfortably selected force $F_{B0}$.

In the case of even steeper downhill grades and when the maximum braking force which can be generated at the existing speed is exceeded, current can be supplied as appropriate to the electrical machine 5 to cause the motor itself to act as a brake.

In a departure from the example described above, in which the force $F_{B0}$ to be exerted by the user is automatically kept at a constant value, the force $F_{B0}$ could also be varied manually or automatically and in particular could be varied as a function of the necessary drive load $F_A$. The switching and control unit 8 can comprise control means which set the force $F_M$ of the electrical machine 5 in accordance with a functional relationship $F_M=f(F_B)$. Depending on the necessary operating load $F_A=f(F_B)+F_B$, the force $F_{B0}$, i.e., the force to be exerted by the user, in this case a load-dependent force, is automatically adjusted in correspondence with the functional relationship $f(F_B)$.

The switching and control unit 8 shown in FIG. 2 therefore comprises control means, which, in situations where a braking force, i.e., a negative force $F_M$, is required, adjust the amount of current generated by the electrical machine 5 in generator mode and thus the braking force $F_M$ necessary to maintain movement.

It is obvious that the load formed by the battery 6 and/or the load resistance 7 is the determining factor with respect to the amount of current generated in generator mode by the electrical machine 5. The capacity of the battery 6 to take up generator current depends on its charge state. If it is fully charged, the battery 6 cannot be used as a load for the generation of a braking force $F_M$.

So that the necessary braking force $F_M$ can nevertheless be produced, the switching and control unit 8 therefore uses either the battery 6 or the load resistance 7 as load, depending on the charge state. A generator current can also flow via a parallel circuit consisting of the battery 6 and the load resistance 7. When the battery 6 is used as brakeload, it is charged under recuperation of drive energy.

Because the necessary braking forces $F_M$ vary as a function of, for example, the steepness of the path, it would be possible to vary the resistance value of the load resistance 7 to arrive at correspondingly different braking forces $F_M$.

In the example shown here, however, the adjustment of different braking forces $F_M$ is carried out with a constant resistance value by means of the periodic interruption of the flow of current I to the battery 6 and/or through the load resistance 7. For this purpose, the switching and control unit 8 contains appropriate interrupting means 9 and 10. During the interruptions of the generator current within successive periods T (FIG. 3), the electrical machine 5 runs at no load and develops no braking force. During the other time segments of the period T, the total amount of generator current I flows. Depending on the time fraction of the interruptions in the periods T, an average generator current I is obtained, which can vary between zero for a long, continuous interruption and the total amount of current I without any interruptions. Thus a braking force $F_M$ between zero and the maximum braking force can be obtained, depending on the current rotational speed of the electrical machine 5.

The reference number 11 in FIG. 2 designates an air cooling system, which carries heat away from the load resistance 7. It is advantageous that, when the dimensions of the load resistance 7 are small, its resistance value can be kept low by the air cooling effect and possibly kept at a constant value.

FIG. 4 shows an alternative embodiment of an assembly 4a, which, in contrast to the assembly 4, does not comprise a separate load resistance. The windings of the electrical machine 5 serve here as the load resistance. To obtain a braking force $F_M$ by way of this load resistance, the electrical machine 5 is periodically short-circuited in the manner shown in FIG. 3 over the course of a time segment of a period T. Depending on the time fraction of period T during which short-circuiting occurs, the resulting braking force $F_M$ varies between zero and the maximum value associated with the rotational speed of the electrical machine at the time in question. To dissipate the resulting heat, an air cooling device 11a is used, which pushes air through the electrical machine 5.

Figure 5:
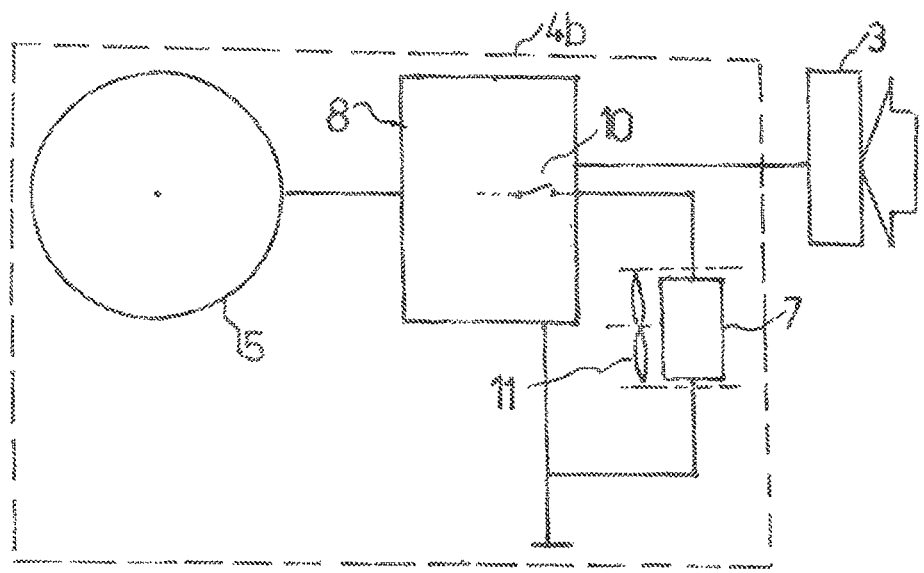

Another exemplary embodiment of an assembly 4b, shown in FIG. 5, differs from the assembly 4 by the absence of the battery 6. The electrical machine 5 serves only to generate a braking force $F_M$. Thus this embodiment is especially suitable for a wheeled walker, which presents the user at all times, even on descending pathways, with a small, selected traveling resistance.

It is obvious that, for the latter embodiment, the variant shown in FIG. 4 without external load resistance, i.e., the resistance being formed by the windings of the electrical machine alone, can also be considered.

It is also obvious that only some of the electrical energy generated by the electrical machine is converted by the loading means into another form of energy, the rest being used to operate components of the device such as electronic circuits or controllers.

The invention claimed is:

1. A device intended to be moved by muscular force, comprising:
   an electrical machine that generates an additional force which influences the movement of the device in addition to the muscular force;
   a sensor for measuring the current muscular force acting on the device;
   equipment for controlling the generation of the additional force by the electrical machine based on a measurement signal of the sensor, wherein the equipment for controlling the generation of the additional force comprise loading means for converting electrical energy generated by the electrical machine in generator mode into a different form of energy; and
   a battery that stores the electrical energy generated by the electrical machine, wherein the control equipment is also operative to automatically control a distribution of the electrical energy generated by the electrical machine in generator mode between the loading means and the battery.

2. The device according to claim 1, wherein the control equipment automatically controls the distribution as a function of the amount of the additional force and/or a charge state of the battery.

3. The device according to claim 1, wherein the control equipment comprise switching means for connecting the loading means and/or the battery as load to the electrical machine.

4. The device according to claim 1, wherein the control equipment is operative to periodically connect the loading means and/or the battery as load to the electrical machine for varying time fractions of a period.

5. The device according to claim 4, wherein the control equipment is operative to set different time fractions and/or periods for the connection of the loading means and the connection of the battery.

6. The device according to claim 1, wherein the loading means comprise a load resistance having a resistance value that is variable by the control equipment.

7. The device according to claim 6, wherein the load resistance is formed by windings of the electrical machine, and the electrical machine can be short-circuited, periodically for certain periods of time, to generate a braking force.

8. The device according to claim 6, further comprising heat dissipaters for dissipating heat from the load resistance.

9. The device according to claim 8, wherein the heat dissipaters for dissipating heat are an air cooling system.

10. The device according to claim 1, wherein the control equipment is operative to set the additional force in correspondence with a predetermined functional relationship between the additional force and the measurement signal of the sensor.

11. The device according to claim 10, wherein the control equipment is operative to adjust the additional force so as to keep the measurement signal of the sensor constant or at a value previously determined by the functional relationship.

* * * * *